United States Patent

Prins et al.

[19]

[11] Patent Number: 5,865,286
[45] Date of Patent: Feb. 2, 1999

[54] AUTOMATIC FEED CLUTCH RELEASE

[75] Inventors: Andrew Carl Prins, Madera; Joost Veltman, Aptos, both of Calif.

[73] Assignee: FMC Corporation, Chicago, Ill.

[21] Appl. No.: 778,355

[22] Filed: Jan. 2, 1997

Related U.S. Application Data

[60] Provisional application No. 60/012,995, Mar. 7, 1996.

[51] Int. Cl.$^6$ ...................................................... F16D 11/06

[52] U.S. Cl. .............................. 192/29; 192/71; 192/101

[58] Field of Search ................................. 192/26, 28, 29, 192/71, 101, 125 C

[56] References Cited

U.S. PATENT DOCUMENTS

| | | | |
|---|---|---|---|
| 2,396,427 | 3/1946 | Johansen et al. | 192/29 |
| 2,517,473 | 8/1950 | Filarski | 192/29 |
| 3,102,620 | 9/1963 | Peddinghaus et al. | 192/29 |

*Primary Examiner*—Richard M. Lorence
*Attorney, Agent, or Firm*—Ronald C. Kamp

[57] ABSTRACT

Clutch mechanism for use in an automatic feed system includes a lockout device that prevents re-engagement of a disengaged clutch mechanism until such time as reset of the clutch is accomplished. When the clutch is first disengaged a mechanical flag cooperates with a specially configured shaft to prevent shaft rotation until such time when the flag has been urged out of blocking contact with the shaft.

9 Claims, 3 Drawing Sheets

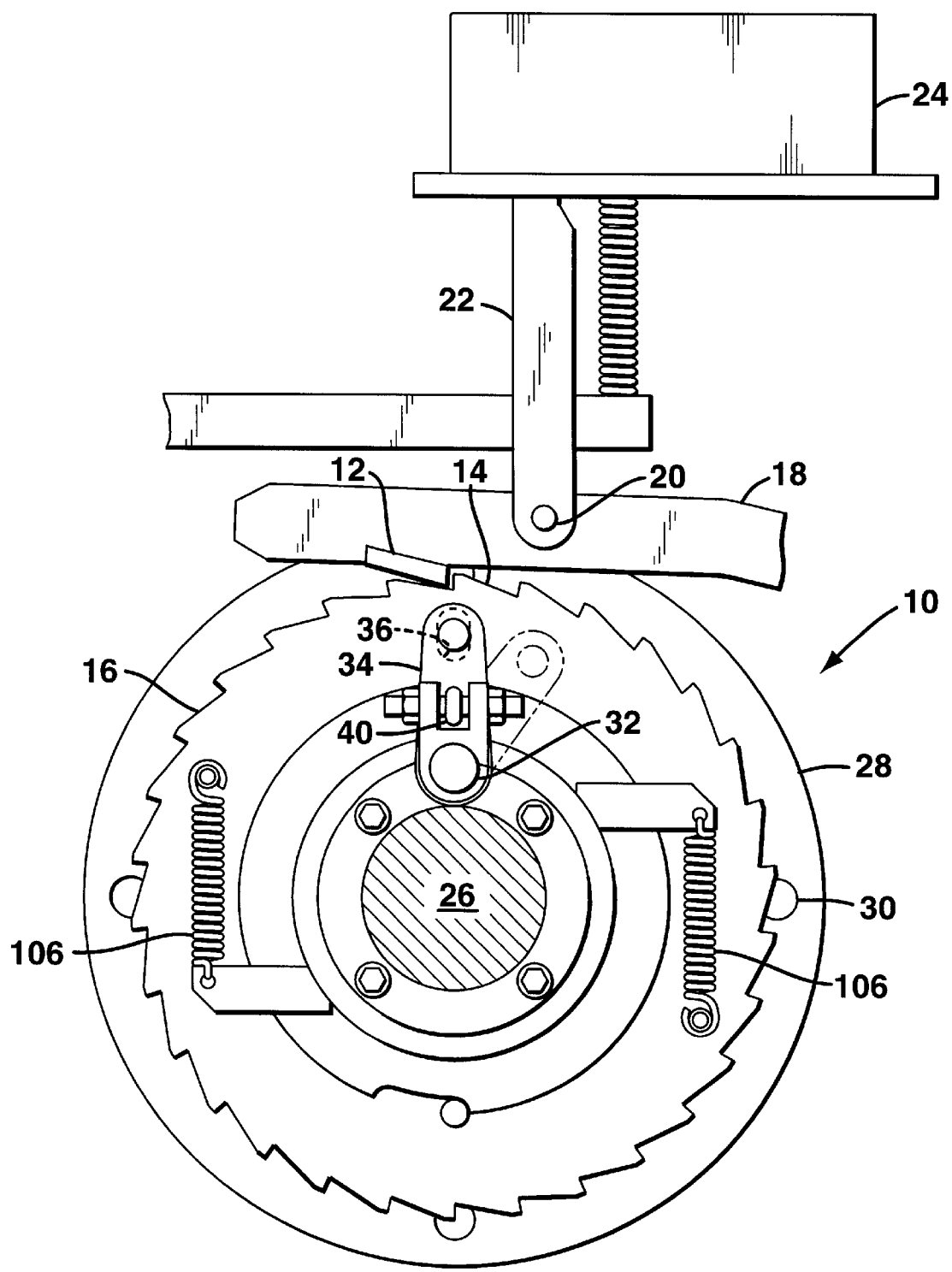
FIG_1

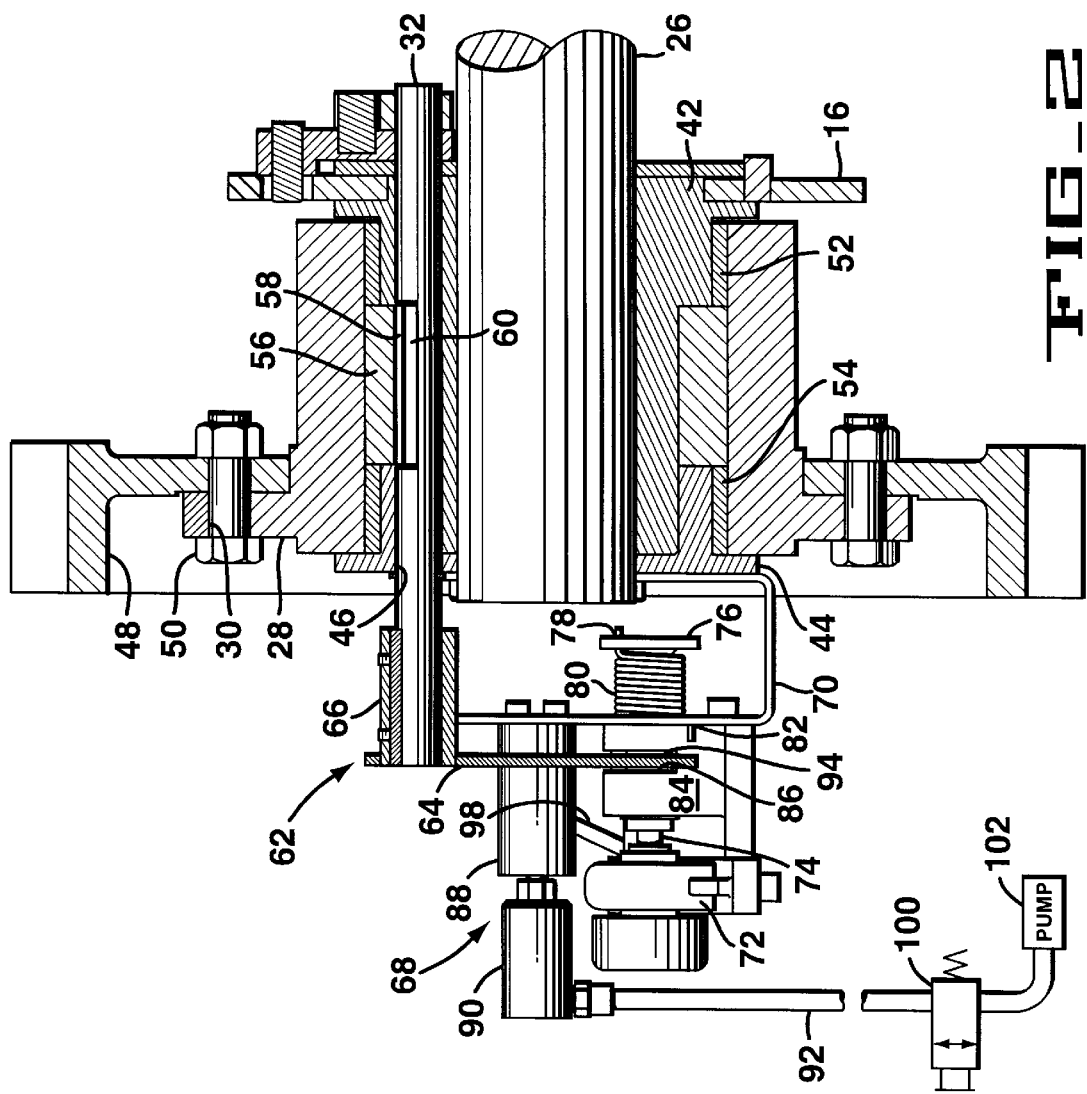
FIG_2

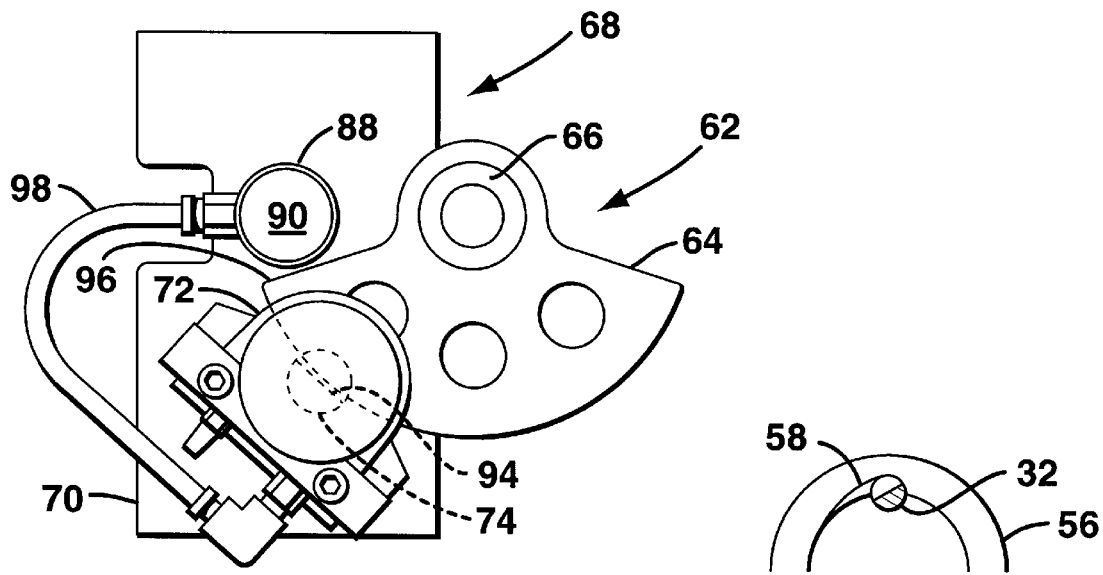
FIG_3
FIG_5
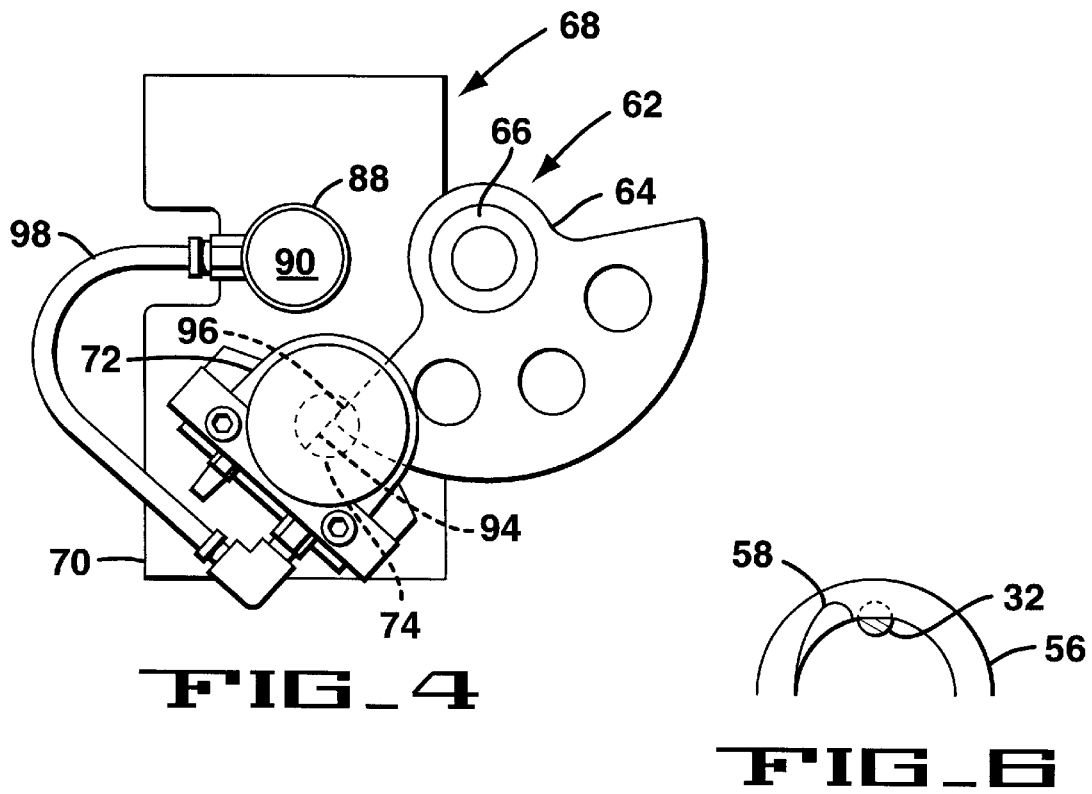
FIG_4
FIG_6

AUTOMATIC FEED CLUTCH RELEASE

This application is based on a U.S. provisional application filed Mar. 7, 1996, having Ser. No. 60/012,995, and priority in that application is claimed for this application.

BACKGROUND OF THE INVENTION

1. Field of the Invention

This invention has to do with clutches used to transmit motion between a rotating shaft and a gear assembly circumferentially arranged to drive, or alternatively to be driven, by the shaft. Imparting motion in the shaft by and from the circumferential gear can be interrupted periodically to enable the gear assembly to freewheel relative to the shaft. More specifically this invention provides a clutch resetting device that will be used in the re-engagement operation of the clutch after the clutch has been activated to release the relative coupling between the driven shaft and the drive gear. The clutch resetting device includes a pneumatic actuator that will prevent the clutch re-engagement until engagement is desired by the machine operator.

2. Description of the Prior Art

The invention is a modification of a clutch engagement apparatus that is incorporated in equipment made by the assignee of this invention. The equipment is a canned food cooking vessel that incorporates a can feeding section that uses a circumferentially positioned drive gear positioned on a shaft in a relationship such that the gear/shaft clutch can be engaged to operate together or disengaged to allow independent motion between the shaft and the gear. In essence the gear would be allowed to freewheel on the shaft when the clutch is disengaged.

SUMMARY OF THE INVENTION

A pneumatically operated release mechanism is provided to remotely reset a clutch in a feed section of a rotary canned food cooker. The clutch is of the type that once tripped needs to be reset to re-engage the disengaged components which in this case includes a shaft and a circumferentially disposed gear on the shaft. Control of the re-engagement function is dependent on a latch surface, part of what will be described as a "flag" in the description of the invention, that is attached to an end of the main clutch engagement rotating rod. The latch surface will be moved into engagement with an interfering surface of a shaft of a rotary actuator thereby preventing re-engagement of the main clutch engagement rotating rod.

BRIEF DESCRIPTION OF THE DRAWINGS

The invention presented herein will be understood from a careful reading of this specification in conjunction with the following drawings in which:

FIG. 1 is an end view of a portion of the clutch system;

FIG. 2 is a side view of the clutch system with some parts broken away and sectioned for clarity;

FIG. 3 is an end view of a clutch re-engagement management apparatus removed from FIG. 2 for clarity;

FIG. 4 is the view of FIG. 3 having the apparatus in a restraining position;

FIG. 5 is a pictograph showing clutch engagement detail;

FIG. 6 is the figure of FIG. 5 showing the clutch engagement detail with a disengaged clutch.

DESCRIPTION OF THE PREFERRED EMBODIMENT

The invention presented herein pertains to large continuous feed rotary cooking vessels. This rotary cooker or sterilizer will receive canned or bottled food products in a continuous stream of product. The cans will be fed in one end of the rotary sterilizer and be removed, cooked and/or sterilized, from the other end of the vessel. The clutch and clutch resetting device comprising the invention herein is a small feature of the rotary sterilizer but an important element of the invention. The following description is directed to the clutch and clutch resetting mechanism of the rotary sterilizer.

In FIG. 1 an end view of the clutch mechanism, indicated generally at 10, is provided. A ratchet tooth engagement pawl 12 may engage a ratchet disc tooth 14 to prevent counter clockwise rotation of the ratchet disc 16 when the pawl is engaged with a ratchet tooth. The pawl 12 is carried by an arm 18 pivotally mounted at an outboard end thereof (not shown) and further pivotally fastened at 20 to a linkage arm 22. The linkage arm 22 emanates from a solenoid housing 24 which will normally hold linkage arm 22 suspended such that arm 18 and pawl 12 do not engage and are out of contact with ratchet disc tooth such as 14. In this configuration the ratchet disc will be free to travel counter clockwise as would be the normal driving mode.

The solenoid housing 24 contains a solenoid that will release the linkage arm 22 when the clutch is to be disengaged, for instance, when there is a can feed jam that has to be cleared. It is largely a schematic presentation in FIG. 1 just to show the type of mechanism surrounding the invention. Significant information is readily available on the rotary cooker or sterilizer, both general information and information about certain details of the machine from FMC Corporation, Food Processing Operations, located in Madera, Calif. and in Chicago, Ill.

Proceeding to the clutch structure of FIG. 1, the ratchet disc 16 is fixedly attached to and will rotate with a drive shaft 26. A drive ring 28 would normally support a gear (not shown) that would allow rotary motion transmission between the shaft 26 and the mechanism driven by the gear ring. The gear ring would be attached to the driving ring 28 by means of fasteners passing through bores such as 30 in the driving ring.

A clutch pin 32 is carried by that portion of the clutch that is fixed to rotate with the drive shaft 26. Clutch pin lever 34 is carried on and solidly affixed to the clutch pin 32. Mechanism 40 simply are parts of an adjustment system well known from use on previously built rotary sterilizes, continuous retorts, and cookers of FMC Corporation.

Turning to FIGS. 2, 3, and 4 the actual area of the invention will be shown.

In FIG. 2 the drive shaft 26 is centrally located and is shown to support the ratchet disc 16. At the outboard end of the shaft a second shaft fitting 44 is fixed to the shaft and rotates with it.

The clutch pin 32 is mounted in a bore 46 through shaft fitting 42 and second shaft fitting 44. The bore 46 will rotate concentrically around the center of the shaft 26 when the shaft 26 is rotating.

The drive ring 28, with its bores such as 30, will support the gear 48 which is fastened by fasteners such as 50 to the drive ring 28. The center of the drive ring, thus the drive ring, is supported on bushings such as 52 and 54. Keyed to the driving ring 28 is a clutching ring 56 which is fixed relative to the driving ring 28. This clutching ring has one engagement cavity 58.

The single engagement cavity 58 is located to engage the clutch pin 32 in certain circumstances. The clutch pin 32 has a machined surface at 60 which is essentially a flat surface machined into the clutch pin 32. This surface 60 will lockingly engage the engagement cavity 58 such that the normally undriven or freewheeling drive ring 28 and gear 48 will be "clutched" or engaged together so that the gear 48 rotates with the drive shaft 26.

FIGS. 5 and 6 are illustrations of how the clutch pin 32 will allow engagement and disengagement between the clutching ring 56 and the shaft fitting 42 which surrounds the shaft 26 as shown in FIG. 2. In FIG. 5 the clutch pin 32 is rotated into a cavity 58 while in FIG. 6, showing the clutch disengaged, the clutch pin 32 is rotated such that the flat of the shaft (which may be slightly arcuate if desired) clears the inside diameter of the clutching ring 56 as shown.

Up to this point the structure described is well known in the art and is what the assignee of this invention, FMC Corporation, has been using for many years to drive the gear 48 through drive shaft 26 in rotary cookers, sterilizers and continuous feed retorts.

To facilitate the invention it was necessary to lengthen the clutch pin 32. In FIG. 2 the extended end of the clutch pin 32 has been machined to lockably receive a flag assembly generally 62. The flag assembly includes a flag 64 integral with a collar 66 to assist in maintaining the flag 64 on the outboard end of the clutch shaft 32.

A flag detenting mechanism, generally 68, will interface with the flag 64 and prevent clutch pin 32 rotation.

The flag detenting mechanism 68 includes a mounting bracket 70 which is fixedly attached to the shaft fittings 42 and 44 to rotate with the shaft when the shaft 26 is driven.

Carried by the mounting bracket 70 is a pneumatic rotary actuator 72. This rotary actuator is conventional and is readily available from pneumatic equipment supply houses. The output of the rotary actuator 72 is a shaft 74 extending from the rotary actuator 72 to a spring restraint 76. The spring restraint 76 is equipped with a hole, slot, detent, or other means 78 to restrain a coil spring 80. A similar hole, slot, detent, or other means is provided at 82 in the block 84. As the spring 80 is rotated by shaft 74 from its preloaded position providing some tension, it will gain or lose tension as is well known.

The shaft 74 from the rotary actuator 72 passes through and is partially journalized by block 84. This block has an opening 86 through which flag 64 will pass.

Item 88 and 90 make up components of a rotary joint so that pressurized air can flow from supply line 92. The rotary joint used in this embodiment is Model 1005-020-3014 from the Deublin Company. Line 98 is the air supply line from block 88 to the rotary actuator 72.

Returning to the shaft 74 emanating from the rotary actuator 72, as best seen in FIGS. 3 and 4, it is machined with a relief section or surface 94 which will either allow the unimpeded passage of the flag 64 past the relief section 94 or will interfere with the edge 96 of the flag 64 thus preventing the flag 64 and the clutch pin it is attached to from rotating and thus engaging the engagement cavity 58 by means of the surface of the clutch pin 32.

In operation the intent of the mechanism is to prevent engagement of the driving ring 28 with the drive shaft 26 until such time as the rotary actuator 72 is remotely activated to release the edge of the flag 96 from contact with the surface 94 of the shaft 74 coming out of the rotary actuator 72. The rotary actuator, a vane type rotary actuator, is known as Model DSR-16-180p manufactured by Festo Mfg. Co. Remote actuation of the rotary actuator 72 will be accomplished from a remote operator's console including a actuating valve 100 receiving and capable of interrupting a pneumatic supply from a pump 102. The actuation of the rotary valve is conventional and routinely known in the pneumatic control industry. This actuator may be a forty-five degree twist spring return switch from Clippard as part no. PL-T-2T-B.

For description of operation looking first at FIG. 1 the mechanism, which is engaged, is on the verge of being disengaged. The ratchet pawl 12 has been positioned by the solenoid 24 to engage the ratchet disc tooth 14. In operation, engaged, the normal direction of rotation of the drive ring 28 and ratchet disc is counter clockwise. When it is necessary to disengage the clutch the pawl 12 will engage the ratchet disc tooth 14. The ratchet disc 16 will be stopped but the shaft 26, with the shaft fitting 42, will continue to rotate such that the clutch pin lever 34 assumes the position shown by the broken line position (a simplified edition of the solid line representation of the clutch pin lever 34) of the clutch pin lever. As the clutch pin lever 34 is moved the attached clutch pin 32 will rotate about its own axis as well. The clutch pin 32 rotation will cause (see FIG. 2) disengagement of the engagement cavity 58 from the surface 60 of the clutch pin. With this clutch pin surface 60 disengaged from the engagement cavity 58 the drive ring 28 and the attached gear 48 will be free from engagement with the drive shaft 26. Now the "clutch" has disengaged.

In FIG. 3, the "engaged" position of the flag 64 relative to the surface 94 of the rotary actuator shaft 74 is shown. The flag 64 is not impeded by the surface 94 contacting it as the arcuate surface of the flag 64 can contact the surface 94 of the shaft 74. (In FIG. 3 a slight gap is shown between these surfaces for clarity but in actuality the surface 94 will be rotated by spring 80 tension to contact the arcuate surface of the flag. Spring biasing of the shaft 74 will be in a clockwise direction in FIG. 3.)

In this engaged position the flag 64, the rotary actuator 72 and the rest of the hardware attached to the mounting bracket 70, the rotary joint between 88 and 90 will, of course, keep item 90 and line 92 from rotating with the mounting bracket 88.

Now looking at FIG. 4 the disengaged clutch position is shown. As stated above when the clutch disengages the clutch pin 32 is rotated. Its rotation will be about twenty-nine degrees. At the outboard end of the clutch pin 32 the flag 64 is fixedly attached to move with the clutch pin 32 thus it rotates to the position shown in FIG. 4. In this position the flag 64 has rotated counter clockwise while the spring loaded shaft 74, having the relief section or flat section 94 riding along the arcuate surface of the flag 64 gets to a point where the spring loaded shaft 74 can rotate by force of the spring 80 to the position shown in the broken line view of FIG. 4. Here the surface 94 will contact the edge or first surface of the flag 96. The flag 64 will not rotate much further as its rotation is controlled by the rotation of the clutch pin 32. The shaft 74 will be restrained from rotation beyond ninety degrees by internal stop limits in the rotary actuator.

This relationship will cause the "lockout" of clutch engagement until the rotary actuator 72 causes the shaft 74 to be rotated out of its blocking relationship shown in FIG. 4 to the unblocked relationship between the second surface of the flag 64 and surface 94 as shown by FIG. 3.

To disengage the clutch lockout and allow re-engagement of the clutch by means of rotation of the clutch pin 32 the following sequence will be undertaken. Whatever has caused the solenoid in box 24 to trip, such as a can jam on an infeed conveyor, has to be remedied. The solenoid will then be reset and the linkage causing engagement of pawl 12 with tooth 14 will be moved out of interference. Springs 104 and 106 will be urging rotation of the shaft fitting and attached shaft 26 to the normal running engaged position; however, the urging will be resisted by the flag surface 96 contacting the surface 94. After the solenoid and the attendant linkage is reset the machine operator will activate the valve 100 causing pneumatic activation of the rotary actuator 72. The rotary actuator 72 will cause shaft 74 to rotate counter clockwise against spring 80 tension. When rotated 90 degrees the removal of the blocking surface 94 of the shaft 74 will allow the flag 64 to rotate with shaft 32 to the position shown in FIG. 3. The shaft 32 will be urged in rotation by the two large tension springs and 106. The shaft 32 will not engage the indentation 58 in the clutching gear ring 56 until the indentation has rotated such that the indented zone 58 is proximate the clutch pin 32. When the indentation 58 is proximate the clutch pin 32, the pin will be able to rotate into the cavity or indentation 58 such that the normal arcuate surface of the clutch pin 32 is nested in the cavity or indentation 58. With this engagement the shaft 26, which has been stationery, will be clutched to the drive ring 28 and gear 48.

The disengaging, clutch engagement restraining and the re-engaging operation will then be initiated again the next time a jam or other event signals the solenoid in box 24 to release the pawl 12 and engage the toothed wheel 16.

The invention presented herein can be summarized as a clutch system for controlling motion between a drive shaft and an associated driven member, wherein the clutch system includes a clutch re-engagement management apparatus for controlling the clutch re-engagement after disengagement of the clutch. The clutch re-engagement management apparatus comprises, among other parts, a clutch pin and a flag means carried by the clutch pin. The flag has first and a second surfaces that can contact a shaft having a surface proximate (in close proximity to or actually touching) the first surface of the flag when the clutch is engaged, and contacting the second surface of the flag when said clutch is disengaged.

Spring means is provided for urging said shaft means to a rotational position wherein the second surface of the flag contacts the surface of the shaft. This shaft is connected to a rotary positioning device for rotating the shaft. The rotary positioning device is a pneumatic rotary actuator which will, upon receiving a signal from a signal means, rotate the shaft to a position proximate said second surface of the flag.

Without a signal means the spring will rotate the shaft to a position where it is relieved from contact with the second surface of the flag. This lack of contact will allow rotation of the clutch pin and the re-engagement of said clutch.

Then subsequent rotation of the clutch pin will cause the flag to rotate such that contact with the first surface of the flag is terminated and contact between said second surface of the flag and the shaft is initiated.

It is believed that this write-up, in conjunction with the drawing figures, provides a complete description of the invention and its operation. Minor changes in the design are contemplated by the inventors; however, it is believed that the preferred embodiment of invention has been set forth.

What is claimed is:

1. In a clutch system, wherein a drive shaft and associated driven member are engageable by rotation of a clutch pin about its own axis to a position in which said pin is in engagement with both said drive shaft and said driven member and disengageable by such rotation to a position out of engagement with both, said clutch system including clutch reengagement management apparatus for controlling the clutch reengagement after disengagement of said clutch, said clutch reengagement management apparatus comprising:

flag affixed to said clutch pin for rotation therewith, said flag having a blocking surface;

a second shaft having a recess and being rotatable about its own axis between a first position in which said second shaft is incapable of contacting said blocking surface when said clutch is engaged, and a second position in which said shaft contacts said blocking surface to preclude rotation of said flag when said clutch is disengaged.

2. The invention in accordance with claim 1 wherein said clutch reengagement management apparatus further comprises:

a spring for urging said second shaft toward said second position wherein said blocking surface contacts said second shaft; and a rotary positioning device connected to said shaft for rotating said second shaft.

3. The invention according to claim 2 wherein said clutch reengagement management apparatus further comprises a valve for actuating said rotary positioning device.

4. The invention in accordance with claim 3 wherein said rotary positioning device is a pneumatic rotary actuator.

5. The invention according to claim 4 wherein said rotary positioning device will, upon receiving pneumatic pressure, rotate said second shaft to said first position.

6. The invention according to claim 5 wherein said rotary positioning device will, upon absence of pneumatic pressure, allow said spring to rotate said second shaft to said second position.

7. The invention according to claim 6 wherein positioning of said blocking surface out of contact with said second shaft will allow rotation of said clutch pin and the reengagement of said clutch.

8. The invention according to claim 7 wherein subsequent rotation of said clutch pin about its axis will cause said flag to rotate such that said second shaft is moved from said first position to said second position.

9. The invention according to claim 8 wherein said second shaft is constantly urged toward said second position by the force of said spring.

* * * * *